Feb. 13, 1968   G. E. SMITH   3,368,923
FLUID SUPPLY REGULATOR AND FUEL CELL SYSTEM WITH SAME
Filed April 30, 1964   3 Sheets-Sheet 1

INVENTOR.
GEORGE E. SMITH
BY
Harris M Humphreys
ATTORNEY

Feb. 13, 1968 G. E. SMITH 3,368,923
FLUID SUPPLY REGULATOR AND FUEL CELL SYSTEM WITH SAME
Filed April 30, 1964 3 Sheets-Sheet 2

INVENTOR.
GEORGE E. SMITH
BY
Harris M. Humphreys
ATTORNEY

Feb. 13, 1968 — G. E. SMITH — 3,368,923
FLUID SUPPLY REGULATOR AND FUEL CELL SYSTEM WITH SAME
Filed April 30, 1964 — 3 Sheets-Sheet 3
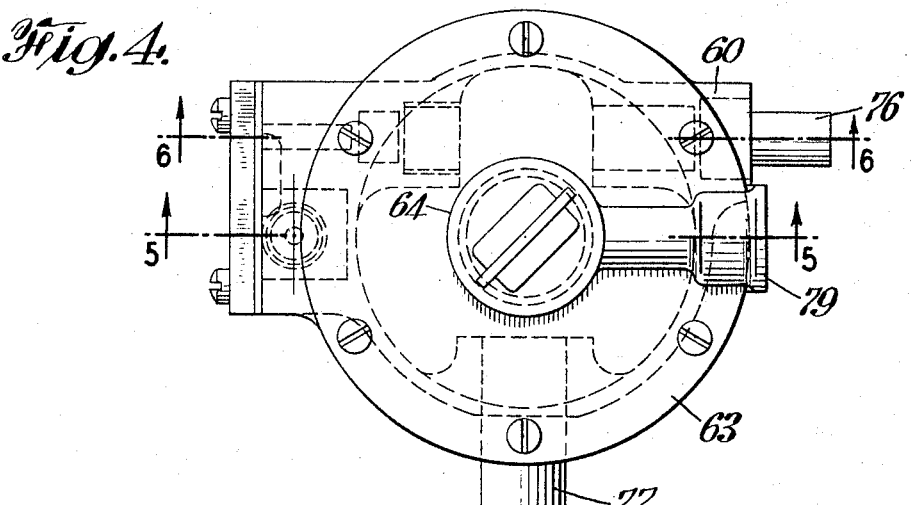
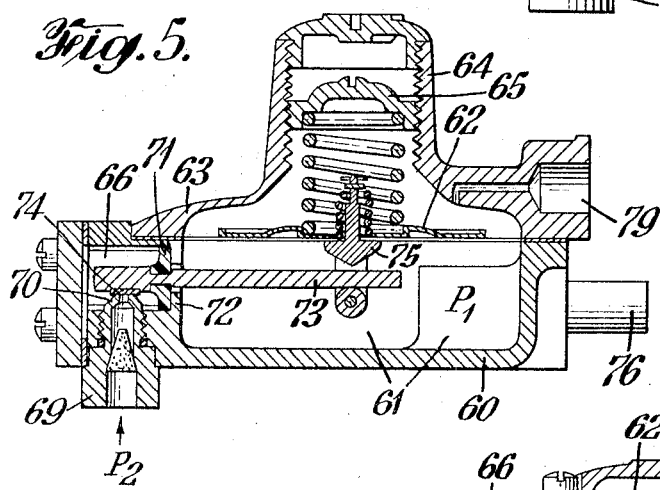
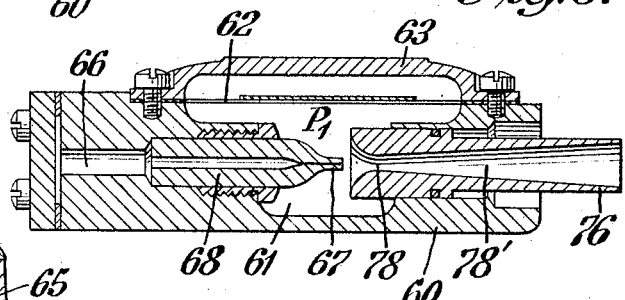
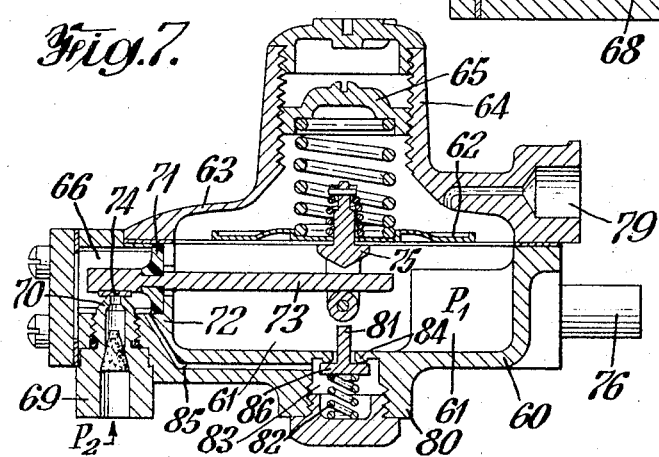
INVENTOR.
GEORGE E. SMITH
BY
*Harrie M. Humphreys*
ATTORNEY

United States Patent Office 3,368,923
Patented Feb. 13, 1968

3,368,923
FLUID SUPPLY REGULATOR AND FUEL
CELL SYSTEM WITH SAME
George E. Smith, Westlake, Ohio, assignor to Union
Carbide Corporation, a corporation of New York
Filed Apr. 30, 1964, Ser. No. 363,692
6 Claims. (Cl. 136—86)

ABSTRACT OF THE DISCLOSURE

Apparatus for regulating the flow of fluid from a high pressure source to a low pressure system which includes a first chamber communicating with the system and a second chamber communicating with the high pressure source, and a valve stem mounted in a resilient gland in a wall separating the two chambers, the valve being responsive to pressure changes in the first chamber. Circulation of fluid through the system can be obtained by a restricted orifice between the first and second chambers.

This application relates to a fluid supply regulator. More particularly, the application is directed to an apparatus to modulate the flow of fluid, particularly gas, from a relatively high pressure source to a system maintained at a relatively low pressure.

It is frequently desirable to provide means for modulating the flow of gas or other fluid from a supply source to a system which consumes fluid either continuously or periodically. Where the differential pressure between the gas supply and the operating system is large, no particular problems arise. A standard two-stage regulator is commonly used to regulate from 2000–2500 p.s.i.g. pressure to less than 10 p.s.i.g.; other common two-stage regulators are used to stage 200–250 p.s.i.g. supply pressures down between 0.1 to a few p.s.i.g. Such devices regulate by means of a diaphragm referred to the low pressure operating system. Minute changes in the low pressure operating system pressure due to flow out of the operating system cause an unbalance on the diaphragm whose control linkage modulates a throttle valve to admit more gas into the operating system thereby restoring same to the set pressure of the operating system. However, in these common two-stage regulators all of the potential energy in the high pressure supply is lost in throttling.

An example of a system in which the operating pressure is low relative to the supply pressure is a fuel cell. In the typical fuel cell, gaseous fuel and oxidant are supplied continuously to the fuel cell electrodes. During operation of the cell, a fuel cell electrode normally operates at a pressure of about 1 p.s.i.g. and consumes gas at varying rates during operation of the cell and no gas at all when the cell is not producing electrical energy. The supply sources of fuel or oxidant gas are commonly maintained at pressures in the range of one to 200 atmospheres. Accordingly, the pressure differential betwen gas supply and operating system may be relatively large and an efficient and accurate gas regulating means is desirable.

Commonly employed regulators for this purpose include conventional two-stage regulators. These regulators, however, have not included means for effecting circulation of the fluid through the operating system. Such circulation is found useful, for example, in a fuel cell electrode system where gas circulation across the electrode surface helps to prevent accumulation of undesirable fluids on such surface. Heretofore such circulation in fuel cell systems has been provided by various fluid pumps which run on electricity produced either by the fuel cell itself or obtained from an independent electrical source. Although conventional two-stage regulators cannot utilize the potential pressure energy in the feed supply, the three-stage regulators can be employed to recover some of the potential energy. However, such regulators are ordinarily large and cumbersome and may have objectionably slow response times due to friction in dynamic seals used to separate high pressure and low pressure chambers. Also, such regulators do not provide the means to utilize the available energy of the feed supply to effect circulation of the fluid through the operating system.

It is therefore an object of the present invention to provide a fluid regulator which is not subject to the disadvantages discussed above.

It is a further object of the invention to provide a fluid regulator, particularly a gas regulator which is light weight and compact and which modulates efficiently the flow of fluid from a relatively high pressure source to a relatively low pressure operating system.

Another object of the invention is to provide a fluid supply regulator which includes means for effecting circulation of the fluid within the low pressure operating system.

It is another object of this invention to provide a fluid regulator wherein potential energy is recovered at an intermediate stage.

A still further object of this invention is to provide a gas regulator particularly suitable for modulating the supply of gas to a fuel cell electrode and including means for circulating gas within the fuel cell electrode system.

These and other objects and advantages of this invention will be apparent from the following description and appended claims.

In the drawings:

FIGURE 4 is a scale drawing of another embodiment of this invention.

FIGURE 5 is a sectional view of the device of FIGURE 4 taken along the line 5—5.

FIGURE 6 is a sectional view of the device of FIGURE 4 taken along the line 6—6; and FIGURE 7 is a sectional view of still another embodiment of the invention.

Figure 1:
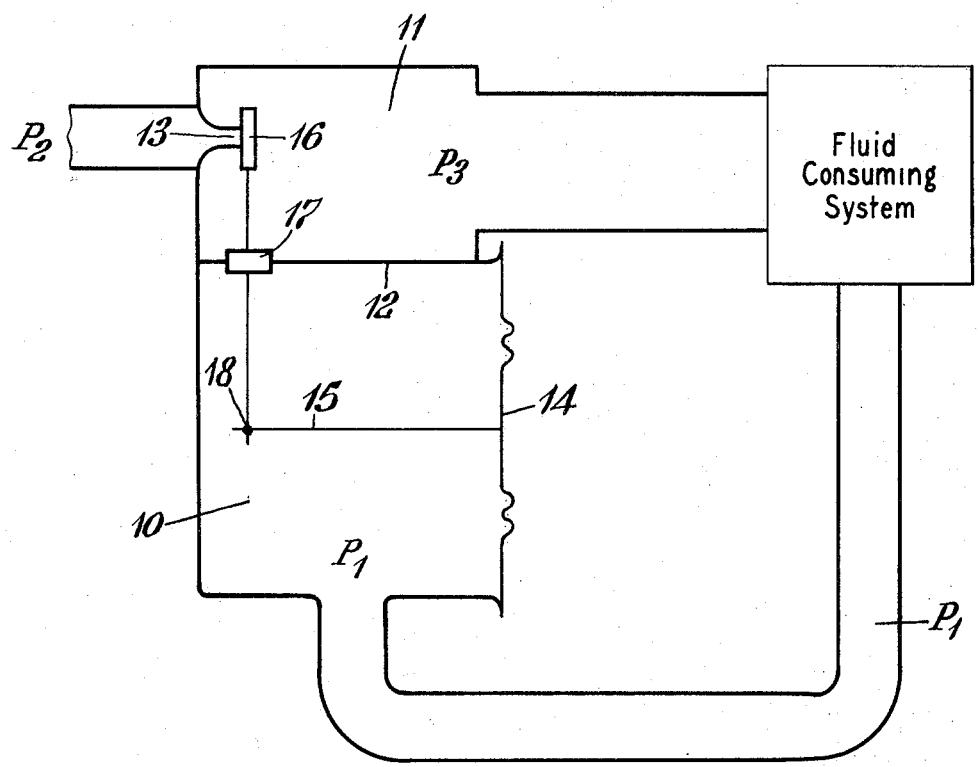
FIGURE 1 is a schematic representation of an apparatus of this invention.

With reference to FIGURE 1, the apparatus of the present invention can be broadly described as comprising a first chamber 10 communicating with a fluid consuming system operating at or near a relatively low pressure $P_1$, and a second chamber 11 communicating (indirectly, through the fluid consuming system) with the first chamber and having at least a portion of its walls 12 in common with the first chamber. The second chamber 11 communicates with a fluid source maintained at a relatively high pressure $P_2$ through a valve seat 13. The first chamber is provided with a pressure responsive diaphragm means 14 which forms at least a portion of the walls of the first chamber. A valve stem 15 having valve seat engaging means 16 at one end and having the other end connected to the diaphragm means is pivotally mounted in a resilient gland means 17 located in the common wall between the chambers 10 and 11.

In FIGURE 1, the valve stem is depicted as hinged at 18. However, other types of valve stem are operable as is apparent from various embodiments of the invention discussed hereinbelow. The diaphragm means 14 can be constructed to respond to a particular pressure of approximately $P_1$ or the diaphragm means can be provided with adjusting means so that the diaphragm means can be set to respond to pressures within a particular range.

When the pressure in that portion of the operating system which is used for pressure reference purposes and the pressure in the chamber 10 communicating with the operating system is at least $P_1$, the diaphragm (being set to respond at about pressure $P_1$) is urged outwardly from the chamber, and valve stem 15, pivoting on resilient gland means 17, urges valve seat engaging means 16 against valve seat 13 and shuts off the fluid supply. When the pressure in the operating system and in chamber 10 drops below $P_1$, the diaphragm means 14 urges valve stem 15 in the opposite direction, thus urging valve seat engaging means 16 away from the valve seat 13 permitting fluid from the supply source to enter chamber 11 and the operating system until the pressure within the system and chamber 10 again reaches $P_1$ and the fluid supply is again shut off.

Where there is substantially no fluid pressure drop across the fluid consuming system, the pressure $P_3$ in chamber 11 and the pressure $P_1$ will be approximately equal when the fluid supply is shut off; when the valve mechanism comprising seat 13 and means 16 opens to admit fluid at pressure $P_2$, the pressure $P_3$ will exceed pressure $P_1$ until fluid pressure equilibrium is re-established. Where there is a fluid pressure drop across the fluid consuming system, the pressure $P_3$ will in general be between supply pressure $P_2$ and reference pressure $P_1$.

The resilient gland means provides a pivot which offers a minimal frictional resistance as the motion of the diaphragm acting upon the valve stem modulates the high pressure fluid supply to the system. The resilient gland means are suitably constructed from natural and synthetic elastomeric materials including natural rubber, copolymers of hexafluoropropylene and vinylidene fluoride, neoprene rubbers, organopolysiloxane rubbers, and the like. Preferably the resilient gland material is chosen to withstand the relatively high pressure drop which can exist across the wall carrying the gland and is chosen to be resistant to corrosion or other chemical attack by the fluid for long periods of time.

The diaphragm means can be conveniently constructed from thin sheets of the same materials used to make the resilient gland means, and less desirably, thin metal sheets.

The pivotal mounting of the valve stem in the resilient gland means according to this invention eliminates frictional resistance to the point where good regulation of fluid flow can be obtained with relatively small diaphragms.

The valve seat means can be constructed from any suitable material usually used in valve seats. The valve seat engaging means can be constructed from the same materials as the resilient gland means, and in addition, such materials as polytetrafluoroethylene, poly(alpha olefins), and polyurethane elastomers.

Figure 2:
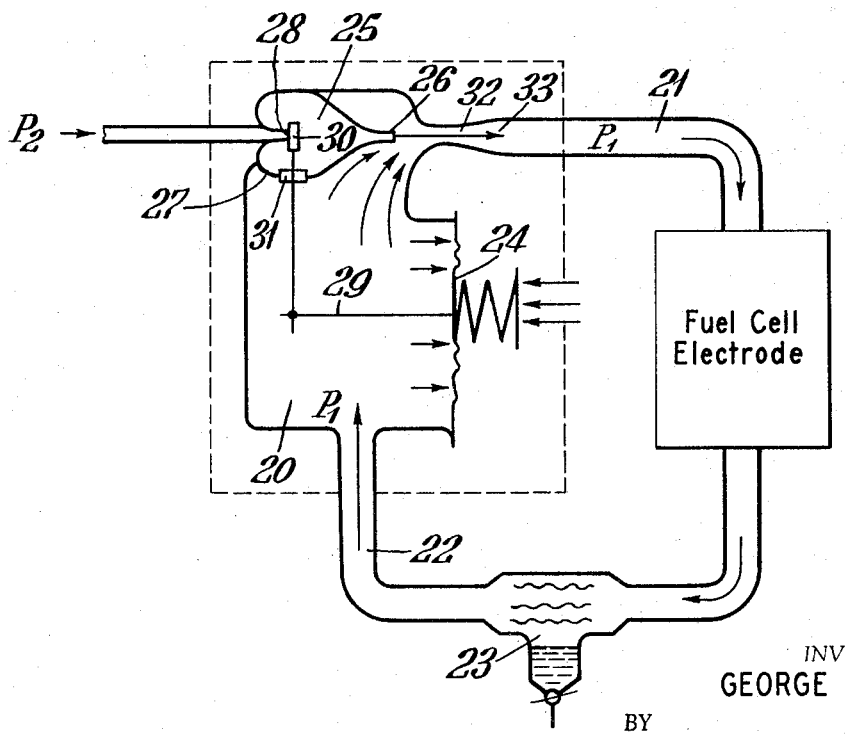
FIGURE 2 is a schematic representation of a preferred embodiment of this invention.

FIGURE 2 shows an embodiment of the invention particularly adapted for use in a fuel cell. The device represented by FIGURE 2 comprises a first chamber 20 connected with a fuel cell electrode by means of conduits 21 and 22 such that the chamber 20, the fuel cell electrode and the conduits 21 and 22 form a closed circuit or loop. The circuit includes means 23 for removing water or other liquid obtained from the operating fuel cell electrode or for occasionally venting gas from the closed circuit. The closed circuit operates at a pressure $P_1$ which, for conventional fuel cells, is about 1 p.s.i.g. A spring loaded diaphragm 24 forms a portion of the walls of chamber 20. A second chamber 25 communicates directly with chamber 20 through a restricted orifice 26, chamber 25 having a wall 27 in common with chamber 20. Chamber 25 communicates with gas supply source at pressure $P_2$ through valve seat 28. A valve stem 29 having valve seat engaging means 30 at one end and having the other end connected to the diaphragm is pivotally mounted in resilient gland means 31 in common wall 27. The operation of the device of FIG. 2 in response to a change in pressure in the closed circuit including chamber 20 is substantially the same as described above with reference to FIGURE 1.

In a particularly preferred embodiment of the invention illustrated in FIGURE 2, the restricted orifice 26 between chamber 25 and chamber 20 is in the form of a jet nozzle and is adjacent the entrance to conduit 21 leading from chamber 20 to the fuel cell electrode. Conduit 21 in turn has a first zone 32 of limited cross-sectional area and a second zone 33 of increasing cross-sectional area between the first zone and the fuel cell electrode. The jet of gas from restricted orifice (nozzle) 26 leaves the orifice at relatively high velocity, flows through zone 32 of limited cross-sectional area and enters zone 33 of increased cross-sectional area, thereby imparting the velocity energy of the incoming gas to gas in conduit 21 and throughout the closed electrode system, and causing circulation of the gas in the system comprising conduit 21, the fuel cell electrode, conduit 22 and chamber 20. Circulation of gas in a fuel cell electrode system is often desirable, since the circulating gas can carry water or other material away from the gas surface of the electrode to a point where such water or other material can be collected and periodically removed from the system. The embodiment of FIGURE 2 provides the means for regulating the supply pressure upstream of nozzle 26 so that the mass flow of gas supplied to the system is exactly matched to the fuel cell gas consumption rate even where such rate is variable, and also provides a means for obtaining gas circulation throughout the fuel cell electrode system.

Figure 3:
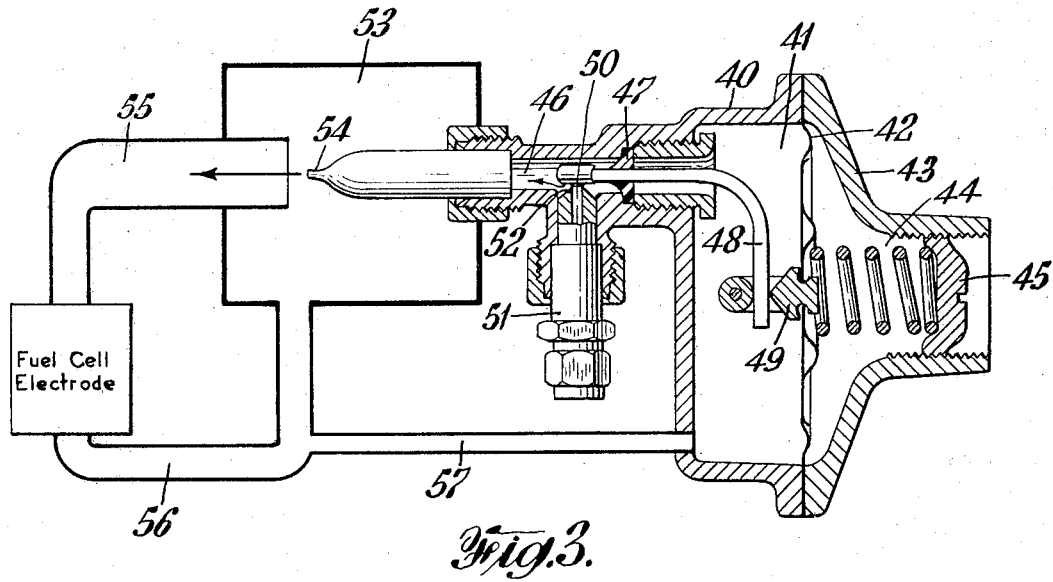
FIGURE 3 is a sectional view of an embodiment of the present invention.

FIGURE 3 is a sectional view of an embodiment of the invention suitable for use in a fuel cell electrode system. The device of FIGURE 3 includes a flanged housing 40 which includes a chamber 41, a spring loaded diaphragm 42 and a flanged housing 43 connected to housing 40 to produce a gas tight seal. Housing 43 contains an elongated chamber 44 which carries the spring loading mechanism for the diaphragm 42 and means 45 for adjusting the tension on the spring. A chamber 46 is defined by an elongated portion of housing 40, chamber 46 being separated from chamber 41 by resilient gland seal 47. Curved valve stem 48 is slidably mounted in yoke 49 which is in turn attached to diaphragm 42. Valve stem 48 extends through gland seal 47 and terminates in valve seat engaging means 50. High pressure gas is introduced into chamber 46 through connection 51 which terminates in valve seat 52. Chamber 46 communicates with chamber 53 through jet nozzle 54. Conduit 55 leads to a fuel cell electrode, and a return conduit 56 leads from the fuel cell electrode back to chamber 53. Conduit 57 connects the fuel cell electrode system with chamber 41 and serves as a low pressure reference tap.

When the fuel cell electrode consumes gas and the pressure in the closed circuit formed by chamber 53, conduit 55, the fuel cell electrode and conduit 56 drops below the predetermined operating pressure of the electrode, the pressure in chamber 41 which is connected to the closed circuit through reference tap 57 also drops below this predetermined pressure. Diaphragm 42 is then urged inwardly by the spring loading mechanism and causes valve stem 48 to pivot in gland means 47 thereby urging valve seat engaging means 50 away from valve seat 52 and permitting gas from the high pressure supply source to enter chamber 46. The higher pressure gas then enters chamber 53 and conduit 55 through jet nozzle 54. Gas entering through nozzle 54 not only returns the pressure within the closed circuit and chamber 41 to the operating pressure thereby urging diaphragm 42 in the opposite direction and closing off the gas supply, but also the high velocity jet of gas causes circulation of gas throughout the closed loop formed by chamber 53, conduit 55, the fuel cell electrode and conduit 56.

FIGURE 4 is a scale drawing of a preferred embodiment of the present invention. The embodiment of FIGURE 4 is further illustrated by the sectional views of FIG- URES 5 and 6 taken along lines 5—5 and 6—6 of FIGURE 4, respectively. The device of FIGURES 4, 5 and 6 comprises a housing 60, a chamber 61 within housing 60, a spring loaded diaphragm 62, a second housing 63 containing an elongated portion 64 carrying the biasing spring for the diaphragm 62 and means 65 for adjusting the tension of the spring, housings 60 and 63 being fastened to provide a gas tight seal. A second chamber 66 within housing 60 communicates with chamber 61 through restricted orifice 67, the restricted orifice being conveniently provided by a constricted length of glass capillary tube 68. Chamber 66 communicates with a high pressure ($P_2$) gas supply through fitting 69 and valve seat 70. A resilient gland seal 71 forms part of common wall 72 between chambers 61 and 66 and is constructed from a copolymer of hexafluoropropylene and vinylidene fluoride. Valve stem 73 has valve seat engaging means 74 at one end, is pivotally mounted in gland seal 71 and has its other end slidably mounted in yoke 75. Coke 75 is in turn connected to the center of diaphragm 62. A conduit 76 leads from chamber 61 to a fuel cell electrode system (not shown) while a second conduit 77 leads from the fuel cell electrode back to chamber 61. Chamber 61, conduits 76 and 77 and the fuel cell electrode form a closed system operating at a relatively low pressure $P_1$. The entrance to conduit 76 is situated opposite restricted orifice 67 and includes a zone 78 of limited cross-sectional area followed by a zone 78' being between zone 78 and the fuel cell electrode. Vent 79 communicates between the spring loaded side of diaphragm 62 and the atmosphere.

FIGURE 7 is a sectional view of a preferred modification of the invention and shows an additional improvement to the device depicted in FIGURES 4, 5 and 6 which provides a gas by-pass around the jet nozzle to provide overload protection to the fuel cell when gas demand rate exceeds the available mass flow rate through the jet nozzle, because of supply pressure limitation. The device of FIGURE 7 includes the elements designated 60 to 79 in FIGURES 4, 5 and 6. As shown in FIGURE 7, the preferred device includes an elongated portion 80 of housing 60 which accommodates a valve stem 81 and spring loading means 82 for valve stem 81. The elongated housing 80 also includes a chamber 83 which communicates with chamber 61 through orifice and valve seat 84 and which communicates with chamber 66 through channel 85. Valve stem 81 has one end disposed adjacent to yoke 75, passes through the orifice of valve seat 84 and terminates in valve seat engaging means 86. The modification of the apparatus of this invention depicted in FIGURE 7 provides a by-pass for gas entering chamber 66 from the high pressure supply source. Where the consumption of gas in the low pressure system is relatively low, the by-pass valve comprising valve seat 84 and valve stem 81 does not operate and gas flows by the normal path from chamber 66 through restricted orifice 67 into chamber 61 and conduit 76. However, when consumption of gas in the low pressure system is relatively great, diaphragm 62 and yoke 75 not only cause valve stem 73 to permit entry of large quantities of gas into chamber 66, but also motion of yoke 75 acts on valve stem 81 and urges valve seat engaging means 86 away from valve seat 84. Thus gas from chamber 66 can simultaneously enter chamber 61 by way of restricted orifice 67 and by way of channel 85, chamber 83 and the orifice defined by valve seat 84. Relatively large amounts of gas can thus enter the low pressure system rapidly without having to pass exclusively through restricted orifice 67.

Other gas by-pass means can be provided in addition to the structure of FIGURE 7. For example in the apparatus of FIGURES 4, 5 and 6, a gas by-pass can be provided by including a pressure relief valve communicating between chamber 66 and chamber 61, which valve will open when the pressure in chamber 66 exceeds a predetermined value.

Additional examples of fluid consuming systems which can be supplied by the regulator of the present invention are chemical reaction vessels which require a pressure controlled supply of reactive gases, liquid organic chemicals and the like apparatus which requires a controlled gaseous atmosphere, for example, apparatus for measuring up-take of various gases by animal tissue, fungi or other living matter.

The apparatus of this invention is useful in regulating the supply of fluids other than gases, for example, the supply of water and liquid organic compounds to reaction mixtures as described in the preceding paragraph.

What is claimed is:

1. Apparatus for regulating the flow of fluid from a relatively high pressure source to a system operating at a relatively low pressure and for affecting circulation of fluid in said system which comprises: a first chamber; a second chamber communicating directly with said first chamber through a restricted orifice, said second chamber having at least a portion of its walls in common with said first chamber; first conduit means leading from a point in said first chamber adjacent said restricted orifice to said system; second conduit means leading from said system to said first chamber; said first chamber, said first conduit means. said system and said second conduit means comprising a closed circuit; a source of fluid at a relatively high pressure communicating with said second chamber through a valve seat; pressure responsive diaphragm means forming at least a portion of a wall of said first chamber; resilient gland means disposed within said common wall; and a valve stem having valve seat engaging means at one end thereof and having the other end thereof connected to said diaphragm means, said valve stem extending through and being pivotally mounted in said gland means whereby motion of said diaphragm means in response to pressure variations within said first chamber acts on said valve stem and causes said valve seat engaging means to modulate the flow of relatively high pressure fluid into said second chamber and subsequently into said first chamber and said system; and whereby flow of fluid through said restricted orifice into said first conduit means means causes circulation of fluid in said circuit.

2. Apparatus in accordance with claim 1 wherein said resilient gland means is composed of an elastomeric material.

3. Apparatus for regulating the flow of gas from a relatively high pressure source to a system operating at a relatively low pressure and for effecting circulation of gas in said system which comprises: a first chamber; a second chamber communicating directly with said first chamber through a jet nozzle, said second chamber having at least a portion of its walls in common with said first chamber; a first conduit leading from said first chamber to said system, said first conduit having its entrance disposed adjacent said jet nozzle; a second conduit leading from said system to said first chamber, said first chamber, said first conduit, said system and said second conduit comprising a closed circuit; a source of gas at a relatively high pressure communicating with said second chamber through a valve seat; a spring loaded diaphragm disposed within a wall of said first chamber; a resilient gland disposed within said common wall; a yoke carried by said diaphragm and disposed within said first chamber; and a valve stem having a valve seat engaging means at one end thereof and having the other end thereof slidably mounted in said yoke, said valve stem extending through and being pivotally mounted in said gland whereby motion of said diaphragm and said yoke in response to pressure variations within said first chamber acts on said valve stem and causes said valve seat engaging means to modulate the flow of high pressure gas into said second chamber and subsequently into said first chamber and said system; and whereby flow of gas from said jet nozzle into said first conduit causes circulation of gas in said circuit.

4. The apparatus in accordance with claim 3 wherein said system is a fuel cell electrode system.

5. The apparatus in accordance with claim 3 in which gas by-pass means communicate between said second chamber and first chamber, whereby gas can pass from said second chamber to said first chamber through said jet nozzle and through said by-pass means simultaneously.

6. Apparatus for regulating the flow of gas from a relatively high pressure source to a fuel cell electrode system operating at a relatively low pressure and for effecting circulation of gas in said system which comprises: a first chamber; a second chamber communicating directly with said first chamber through a jet nozzle, said second chamber having at least a portion of its walls in common with said first chamber; a first conduit leading from said first chamber to said fuel cell electrode system, said first conduit having its entrance disposed adjacent said jet nozzle, and said first conduit having a first zone of limited cros-sectional area and a second zone of increasing cross-sectional area, said second zone being disposed between said first zone and said fuel cell electrode system; a second conduit leading from said fuel cell electrode system to said first chamber, said first chamber, said first conduit, said fuel cell electrode system and said second conduit comprising a closed circuit; a source of gas at a relatively high pressure communicating with said second chamber through a valve seat; a spring loaded diaphragm disposed within a wall of said first chamber; a resilient gland disposed within said common wall; a yoke carried by said diaphragm and disposed within said first chamber; and a valve stem having valve seat engaging means at one end thereof and having the other end thereof slidably mounted in said yoke, said valve stem extending through and being pivotally mounted in said gland, whereby motion of said diaphragm and said yoke in response to pressure variations within said first chamber acts on said valve stem and causes said valve seat engaging means to modulate the flow of high pressure gas into said second chamber and subsequently into said first chamber and said system, and whereby flow of gas from said jet nozzle into said first conduit causes circulation of gas in said circuit.

References Cited
UNITED STATES PATENTS

| | | | |
|---|---|---|---|
| 1,941,831 | 1/1934 | Ford | 137—505.47 X |
| 2,506,031 | 5/1950 | McDermott | 137—505.47 X |
| 2,898,930 | 8/1959 | St. Clair et al. | 137—505.46 X |
| 3,056,424 | 10/1962 | Courtot et al. | 137—505.47 X |
| 3,250,295 | 5/1966 | Palmer et al. | 251—61 X |
| 3,253,957 | 5/1966 | Turner et al. | 136—86 |

ALLEN B. CURTIS, *Primary Examiner.*